United States Patent [19]

Ogasa et al.

[11] Patent Number: 4,490,520

[45] Date of Patent: Dec. 25, 1984

[54] PROCESS FOR PREPARING IMPACT-RESISTANT POLYAMIDES

[75] Inventors: Masao Ogasa, Kawachinagano; Masao Nishiyama, Takatsuki; Kaoru Ohtsuki, Osaka, all of Japan

[73] Assignee: UBE Industries, Ltd., Osaka, Japan

[21] Appl. No.: 469,579

[22] Filed: Feb. 24, 1983

[30] Foreign Application Priority Data

Mar. 4, 1982 [JP] Japan ................................. 57-33013

[51] Int. Cl.³ .............................................. C08G 69/20
[52] U.S. Cl. ..................................... 528/315; 528/323
[58] Field of Search ................................ 528/315, 323

[56] References Cited

U.S. PATENT DOCUMENTS

| 3,423,372 | 1/1969 | Steely | 528/315 |
| 3,427,289 | 2/1969 | Warner | 528/315 |
| 3,440,227 | 4/1969 | Baum | 528/315 |
| 3,721,652 | 3/1973 | Barnes | 528/315 |
| 4,188,478 | 2/1980 | Goebel | 528/315 |

*Primary Examiner*—Harold D. Anderson
*Attorney, Agent, or Firm*—Burgess, Ryan & Wayne

[57] ABSTRACT

A process for preparing polyamides having improved impact strength and elongation comprising polymerizing an -lactam in the presence of (1) an alkali catalyst and (2) the reaction product of (a) a polyfunctional co-catalyst such as a polyisocyanate and (b) a polyoxyalkalene amine. The polyamides of the present invention are particularly useful for making strong tough molded or cast articles.

16 Claims, No Drawings

PROCESS FOR PREPARING IMPACT-RESISTANT POLYAMIDES

BACKGROUND OF THE INVENTION

(1) Field of the Invention

This invention relates to a process for preparing a polyamide having a high elongation and a high impact strength by alkali polymerization of an ω-lactam.

(2) Description of the Prior Art

The so-called alkali polymerization process for polymerizing an ω-lactam by the actions of an alkali catalyst and a co-catalyst is known. A polyamide obtained according to this process is excellent in mechanical strength characteristics such as tensile strength, flexural strength and initial tensile modulus and this polyamide is used as a machine part and an industrial material. This polyamide, however, is not advantageous in that both the elongation and impact strength are low and the polyamide is hard and brittle. Therefore, this polyamide cannot be used in fields where softness is required.

Several proposals have heretofore been made to improve the elongation and impact strength of polyamides obtained by alkali polymerization of ω-lactams.

For example, British Pat. No. 1,067,153 discloses a process in which an ω-lactam is polymerized by the actions of an alkali catalyst and a polyurethane co-catalyst having an isocyanate group at the molecule ends or on the side chains thereof, which is obtained by reaction between a polyol having hydroxyl groups at the molecule ends or on the side chains and a diisocyanate. However, the impact strength of a polyamide obtained according to this process is not so improved. Moreover, as is well-known, this polyurethane co-catalyst is poor in the thermal stability and storage stability, resulting in various troubles in carrying out this process on an industrial scale.

Japanese Examined Patent Publication No. 20,475/68 discloses a process for preparing a polyamide having improved water absorption and antistatic property, wherein an ω-lactam is subjected to alkali polymerization in the presence of an alkali catalyst and a product having isocyanate groups at the molecule ends or on the side chains, which is obtained by reacting a polymer having on the side chains functional groups capable of reacting with an isocyanate group, with a diisocyanate. In this prior art reference, an amino group is referred to as an example of the functional group capable of reacting with an isocyanate group. However, a polymer having an amino group is not specifically disclosed and there is not given any working example concerning this polymer.

SUMMARY OF THE INVENTION

The primary object of the present invention is to provide a process for preparing a polyamide having high elongation and impact strength by polymerizing an ω-lactam by the actions of an alkali catalyst and a product obtained from a specific polymer having an amino group in the molecular chain and a polyfunctional co-catalyst.

More specifically, in accordance with the present invention, there is provided a process for the preparation of impact-resistant polyamides, which comprises polymerizing an ω-lactam in the presence of (1) an alkali catalyst and (2) a product obtained by reaction between (a) a polyfunctional co-catalyst and (b) a polyoxyalkylene amine.

DESCRIPTION OF THE PREFERRED EMBODIMENTS

According to the present invention, a polyamide having high elongation and high impact strength can be obtained without reduction in the rate of polymerization and the conversion. It is known that if an ω-lactam is subjected to alkali polymerization in the presence of a compound containing an active hydrogen atom, such as a compound having an amino or hydroxyl group, the rate of polymerization and the conversion are reduced. If this known fact is taken into consideration, it would be surprising that, even if an amino group-containing polymer is used, neither the rate of polymerization of an ω-lactam nor the conversion thereof, is reduced in the present invention.

As specific examples of the ω-lactam used in the present invention, there can be mentioned γ-butyrolactam, δ-valerolactam, ε-caprolactam, ω-enantholactam, ω-pryllactam, ω-undecanolactam and ω-lauryllactam. These ω-lactams may be used either alone or in combination.

All of the known alkali catalysts used in the alkali polymerization of ω-lactams can be used in the present invention. For example, there can be used alkali metals, alkaline earth metals, hydrides, oxides, hydroxides, carbonates, alkyl compounds and alkoxides of alkali metals and alkaline earth metals, Grignard's reagents, sodium naphthalene, and reaction products of these metals or metal compounds with ω-lactams, such as sodium and potassium salts of ω-lactams. It is preferred that the alkali catalyst be used in an amount of 0.05 to 10 mole %, more preferably 0.2 to 5 mole %, based on the ω-lactam.

All of the known compounds used in the alkali polymerization of lactams can be used as the polyfunctional co-catalyst in the present invention. For example, there can be used polyisocyanates such as toluene diisocyanate, 4,4'-diphenylmethane diisocyanate, hexamethylene diisocyannate, polymethylene polyphenyl polyisocyanate and carbodiimide-modified diisocyanate; carbamidolactams such as hexamethylene- 1,6-bis-carbamidocaprolactam and N,N'-diphenyl-p-phenylene-bis-carbamidocaprolactam; acid chlorides such as terephthaloyl chloride, adipoyl chloride and sebacoyl chloride; and polyacyl lactams such as adipoyl-bis-caprolactam and terephthaloyl-bis-caprolactam. Among these polyfunctional compounds, diisocyanates and carbamidolactams are preferred.

As the polyoxyalkylene amine, there are preferably used compounds represented by the following formula:

wherein $R^1$ stands for an alkylene group having 1 to 3 carbon atoms and n is an integer of at least 3, and compounds represented by the following formula:

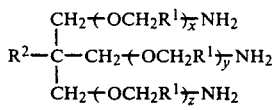

wherein $R^1$ is the same as defined above, $R^2$ is a hydrocarbon group having 1 to 20 carbon atoms, and x, y and z are integers of from 1 to 10. As specific examples, there can be mentioned polyoxyethylene diamine, polyoxypropylene diamine, polyoxytetramethylene diamine and Jeffamine T403 (trademark, supplied by Jefferson Chemical Co.). Among these amines, polyoxypropylene diamine is preferably used. From the viewpoint of the solubility in the ω-lactam, it is preferred that the number-average molecular weight of the polyoxyalkylene amine be in the range of from 300 to 20,000. The molecular weight is determined by the amino terminal group determining procedure described in *Experiments in Polymer Science*, E. A. Collins, J. Bares and F. W. Billmeyer, Jr. (Wiley Interscience, New York, 1973) pp. 362-367.

The reaction between the polyfunctional co-catalyst and the polyoxyalkylene amine may be carried out prior to the alkali polymerization of the ω-lactam or it may be effected during the alkali polymerization by adding the polyfunctional co-catalyst and the polyoxyalkylene amine to the polymerization system.

It is preferred that the polyfunctional co-catalyst be used in such an amount that the total number (a) of the functional groups of the polyfunctional co-catalyst is larger than the total number (b) of the amino groups of the polyoxyalkylene amine and especially, the relation of $1 < |(a)/(b)| \leq 2$ is satisfied.

It is preferred that the amount used of the polyoxyalkylene amine be 1 to 60% by weight, especially 5 to 30% by weight, based on the ω-lactam. If the amount of the polyoxyalkylene amine is smaller than the lower limit, the resulting polyamide is poor in elongation and impact strength. In contrast, even if the amount of the polyoxyalkylene amine is larger than the upper limit, no substantial increase of the intended effects can be attained and the inherent properties of the polyamide are drastically reduced.

When the polyfunctional co-catalyst is reacted with the polyoxyalkylene amine prior to the alkali polymerization, this reaction can easily be advanced by contacting the polyfunctional co-catalyst with the polyoxyalkylene amine in the presence or absence of a reaction solvent. As the reaction solvent, there can be mentioned, for example, benzene, toluene, xylene and a molten ω-lactam. From the industrial viewpoint, it is preferred that a molten ω-lactam, which need not particularly be removed from the reaction product, be used as the reaction solvent. The reaction temperature is ordinarily in the range of from 10° to 200° C., preferably 70° to 160° C., and when a molten ω-lactam is used as the reaction solvent, the reaction is carried out at a temperature higher than the melting point of the ω-lactam.

In the present invention, the alkali polymerization of the ω-lactam may be carried out according to known procedures.

The polymerization is carried out at a temperature of at least the melting point of the ω-lactam to be polymerized but lower than the melting point of the formed polyamide. The polymerization time is ordinarily not longer than 2 hours.

In the present invention, the ω-lactam may be polymerized in the presence of an additive provided that it has no adverse influence on the polymerization reaction, for example, a plasticizer, a filler, a fiber, a foaming agent, a dye or pigment or stabilizer such as an antioxidant. As preferred examples of the plasticizer, N-alkylpyrrolidone and dialkylimidazolidinone can be mentioned. The amount of the plasticizer used is ordinarily 2 to 25% by weight based on the ω-lactam. As specific examples of the filler, there can be mentioned calcium carbonate, wollastonite, kaolin, graphite, gypsum, feldspar, mica, asbestos, carbon black and molybdenum disulfide. As specific examples of the fiber, there can be mentioned a milled glass fiber, a fibrous magnesium compound, a potassium titanate fiber, a mineral fiber, a graphite fiber, a boron fiber and a steel fiber. The amount of the filler and/or the fiber used is ordinarily 2 to 50% by weight based on the ω-lactam. As specific examples of the foaming agent, benzene, toluene and xylene can be mentioned, and the amount of the foaming agent used is ordinarily 1 to 15% by weight based on the ω-lactam.

The present invention is advantageously employed for preparing shaped articles such as rods, plates, pipes and automobile parts directly from ω-lactams by a cast molding method or a reaction injection molding method. Furthermore, chips of polyamides prepared by the process of the present invention may be formed into various molded articles, sheets and fibers by an injection molding method or an extrusion molding method.

The present invention will now be described with reference to the following Examples and Comparative Examples. In these Examples and Comparative Examples, the rate of polymerization was expressed by the duration of time from the initiation of mixing of the monomer liquid to the time when the reaction mixture no longer flowed. The monomer content in the molded article was measured according to the method of JIS K-6810. The elongation and notched Izod impact strength were measured in the absolutely dry state according to ASTM D-638-64T and ASTM D-256-56, respectively.

EXAMPLE 1

A flask was charged with 800 g of substantially anhydrous ε-caprolactam, and it was melted at 120° C. Then, 5 g of a sodium methylate powder was added to the melt in the flask and methyl alcohol formed as a by-product was removed under a reduced pressure to form an alkali catalyst liquid. Then, 200 g of polyoxypropylene diamine having an average molecular weight of 2,000 (0.014 mole per mole of ε-caprolactam) was added to the content of the flask and the mixture was sufficiently stirred. Then, 20.9 g of toluene diisocyanate was added under agitation, and the mixture was immediately charged into a glass tube preheated at 160° C., which had an inner diameter of 80 mm and a height of 400 mm. The inside atmosphere of the glass tube was replaced by nitrogen and the glass tube was held in an oil bath maintained at 160° C. for 30 minutes, and the obtained shaped article was withdrawn. The rate of polymerization and the monomer content, elongation and notched Izod impact strength of the shaped article are shown in Table 1.

COMPARATIVE EXAMPLE 1

Procedures of Example 1 were repeated in the same manner except that the polyoxypropylene diamine was not added. The results are shown in Table 1.

COMPARATIVE EXAMPLE 2

Procedures of Example 1 were repeated in the same manner except that 11.6 g of hexamethylene diamine (0.014 mole per mole of ε-caprolactam) was used instead of the polyoxypropylene diamine. The results are shown in Table 1.

COMPARATIVE EXAMPLE 3

Procedures of Example 1 were repeated in the same manner except that 200 g of polypropylene glycol having an average molecular weight of 2,000 (0.014 mole per mole of ε-caprolactam) was used instead of the polyoxypropylene diamine. The results shown in Table 1.

Incidentally, the mark "-" in Table 1 indicates that the measurement could not be carried out.

TABLE 1

|  | Rate of Polymerization | Monomer Content (%) | Elongation (%) | Notched Izod Impact Strength (kg · cm/cm) |
|---|---|---|---|---|
| Example 1 | 4 minutes and 30 seconds | 3.0 | 280 | 23.0 |
| Comparative Example 1 | 4 minutes and 21 seconds | 3.1 | 22 | 3.9 |
| Comparative Example 2 | 8 minutes and 15 seconds | 15.0 | — | — |
| Comparative Example 3 | 5 minutes and 35 seconds | 6.8 | 120 | 11.0 |

In Comparative Example 2, since the monomer content was too high, the elongation and Izod impact strength could not be measured.

EXAMPLE 2

Procedures of Example 1 were repeated in the same manner except that the amount of the polyoxypropylene diamine added was changed to 300 g and 79.2 g of 4,4'-diphenylmethane diisocyanate was used instead of toluene diisocyanate. The results are shown in Table 2.

EXAMPLE 3

Substantially anhydrous ε-caprolactam maintained at φ° C. was charged into two flasks (500 g in each flask) and was maintained at this temperature. To one flask was added 10.6 g of methyl magnesium bromide (used in the form of an about 25% by weight solution in tetrahydrofuran), and methane as a by-product and tetrahydrofuran as the solvent were removed under a reduced pressure to form an alkali catalyst liquid.

To the other flask were added 100 g of polyoxypropylene diamine having an average molecular weight of about 2,000 and 25.2 g of adipoyl-bis-caprolactam and the mixture was stirred at 100° C. for 30 minutes to effect reaction.

Both the liquids were mixed together while being stirred, and the experiment was carried out in the same manner as in Example 1. The monomer content, elongation and notched Izod impact strength were measured. The results are shown in Table 2.

EXAMPLE 4

A flask was charged with 500 g of substantially anhydrous ε-caprolactam maintained at 120° C., and the charge was maintained at this temperature. Then, 3.5 g of a sodium methylate powder was added into the flask, and methanol formed as a by-product was removed under a reduced pressure to form an alkali catalyst liquid. Then, 300 g of substantially anydrous ε-caprolactam maintained at 120° C. was charged in another flask, and 190 g of polyoxypropylene diamine having an average molecular weight of 2,000, 10 g of polyoxypropylene triamine having an average molecular weight of 480 and 36 g of 4,4'-diphenylmethane diisocyanate were added and reaction was carried out with stirring in a nitrogen atmosphere for 30 minutes.

Both the liquids were mixed together while being stirred, and the mixture was charged in a mold having a length of 300 mm, a width of 300 mm and a thickness of 20 mm and the mold was held in an oil bath maintained at 140° C. for 10 minutes. The results are shown in Table 2.

TABLE 2

|  | Rate of Polymerization | Monomer Content (%) | Elongation (%) | Notched Izod Impact Strength (kg · cm/cm) q |
|---|---|---|---|---|
| Example 2 | 2 minutes and 30 seconds | 3.5 | 390 | NB |
| Example 3 | — | 3.8 | 165 | 13.0 |
| Example 4 | — | 4.0 | 365 | 31.0 |

Incidentally, the mark "-" in Table 2 indicates that the measurement was not carried out, and the symbol "NB" in Table 2 indicates that the sample was not broken at the measurement of the Izod impact strength.

We claim:

1. A process for the preparation of an impact-resistant polyamide, which comprises polymerizing an ω-lactam in contact with (1) an alkali catalyst and (2) a product obtained by the reaction between (a) a polyfunctional co-catalyst used in the alkali polymerization of ω-lactam and (b) a polyoxyalkylene amine, the amount of the polyfunctional co-catalyst being such that the total number of the functional groups of the polyfunctional co-catalyst is larger than the total numbr of the amino groups of the polyoxyalkylene amine.

2. A process according to claim 1, wherein the polyoxyalkylene amine is at least one compound selected from the group consisting of compounds represented by the formula:

$$H_2NR^1CH_2(OCH_2R^1)_{\overline{n}}NH_2$$

wherein $R^1$ represents an alkylene group having 1 to 3 carbon atoms and n is an integer of at least 3, and compounds represented by the following formula:

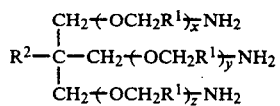

$$\begin{array}{c} CH_2(OCH_2R^1)_{\overline{x}}NH_2 \\ | \\ R^2-C-CH_2(OCH_2R^1)_{\overline{y}}NH_2 \\ | \\ CH_2(OCH_2R^1)_{\overline{z}}NH_2 \end{array}$$

wherein $R^1$ is the same as defined above, $R^2$ is a hydrocarbon group having 1 to 20 carbon atoms, and x, y and z are integers of from 1 to 10.

3. A process according to claim 2, wherein the polyoxyalkylene amine is at least one compound selected from the group consisting of polyoxypropylene amine and polyoxytetramethylene amine.

4. A process according to claim 1, wherein the polyoxyalkylene amine has a number average molecular weight of from 300 to 20,000.

5. A process according to claim 1, wherein the amount of the polyoxyalkylene amine is in the range of from 1 to 60% bY weight based on the weight of the ω-lactam.

6. A process according to claim 5, wherein the amount of the polyoxyalkylene amine is in the range of from 5 to 30% by weight based on the weight of the ω-lactam.

7. A process according to claim 1, wherein the polyfunctional co-catalyst is selected from the group consisting of polyisocyanates, carbamidolactams, carboxylic acid chlorides and polyacyl lactams.

8. A process according to claim 7, wherein the polyfunctional co-catalyst is selected from the group consisting of polyisocyanates and carbamidolactams.

9. A process according to claim 1, wherein the total number (a) of the functional groups of the polyfunctional co-catalyst and the total number (b) of the amino groups of the polyoxyalkylene amine satisfy the following relation:

$$1 < [(a)/(b)] \leq 2$$

10. a process according to claim 1, wherein the alkali catalyst is at least one member selected from the group consisting of alkali metals; alkaline earth metals; hydrides, oxides, hydroxides, carbonates, alkyl compounds and alkoxides of alkali metals and alkaline earth metals; Grignard's reagents; sodium naphthalene; and alkali metal salts and alkaline earth metal salts of ω-lactams.

11. A process according to claim 1, wherein the amount of the alkali catalyst is in the range of from 0.05 to 10 mole % based on the ω-lactam.

12. A process according to claim 1, wherein said polymerization of the ω-lactam is conducted in a mold to produce a shaped article.

13. A process according to claim 1 further comprising reacting the polyfunctional co-catalyst and the polyoxyalkylene amine prior to the polymerization reaction.

14. A process according to claim 13 wherein the reaction of the polyfunctional co-catalyst and the polyoxyalkylene amine is conducted in a solvent at a temperature between 10° and 200° C.

15. A process according to claim 14 wherein the solvent is selected from the group consisting of benzene, toluene, xylene and molten ω-lactam.

16. A process according to claim 14 wherein the solvent is molten ω-lactam and the reaction is conducted at a temperature higher than the melting point of said ω-lactam.

* * * * *